United States Patent
Claffy et al.

(10) Patent No.: US 11,767,102 B2
(45) Date of Patent: *Sep. 26, 2023

(54) AIRCRAFT, SYSTEMS, AND METHODS FOR TRIM CONTROL IN FLY-BY-WIRE AIRCRAFT SYSTEMS

(71) Applicant: Gulfstream Aerospace Corporation, Savannah, GA (US)

(72) Inventors: Kevin Claffy, Savannah, GA (US); Jong-Yeob Shin, Savannah, GA (US)

(73) Assignee: Gulfstream Aerospace Corporation

( * ) Notice: Subject to any disclaimer, the term of this patent is extended or adjusted under 35 U.S.C. 154(b) by 0 days.

This patent is subject to a terminal disclaimer.

(21) Appl. No.: 17/657,277

(22) Filed: Mar. 30, 2022

(65) Prior Publication Data
US 2022/0371722 A1 Nov. 24, 2022

Related U.S. Application Data

(63) Continuation of application No. 14/513,125, filed on Oct. 13, 2014, now Pat. No. 11,299,257.

(51) Int. Cl.
*B64C 13/50* (2006.01)
*B64C 13/04* (2006.01)

(52) U.S. Cl.
CPC ........ *B64C 13/506* (2018.01); *B64C 13/0421* (2018.01); *B64C 13/0427* (2018.01); *B64C 13/503* (2013.01)

(58) Field of Classification Search
None
See application file for complete search history.

(56) References Cited

U.S. PATENT DOCUMENTS

| | | |
|---|---|---|
| 3,094,299 A | 6/1963 | Bond et al. |
| 3,704,843 A | 12/1972 | Jenny |
| 5,446,666 A | 8/1995 | Bauer |
| 5,493,497 A | 2/1996 | Buus |
| 5,692,708 A | 12/1997 | Coleman |
| 5,908,176 A | 6/1999 | Gilyard |
| 6,236,914 B1 | 5/2001 | Kaloust |
| 7,021,587 B1 | 4/2006 | Younkin |
| 7,284,984 B1 | 12/2007 | Zyskowski |

(Continued)

OTHER PUBLICATIONS

Fred George, "We Test-Run Embraer's Newest Aircraft," Aviation Week & Space Technology, May 19, 2014, pp. 1-8, retrieved from the internet on Apr. 17, 2018 at: http://aviationweek.com/business-aviation/we-test-run-embraer-s-newest-aircraft.

*Primary Examiner* — Navid Z. Mehdizadeh
*Assistant Examiner* — Kenneth M Dunne
(74) *Attorney, Agent, or Firm* — LKGlobal | Lorenz & Kopf LLP

(57) ABSTRACT

Aircraft, fly-by-wire systems, and controllers are provided. An aircraft includes a trim control system and a fly-by-wire system. The trim control system is configured for controlling surfaces of the aircraft. The fly-by-wire system is communicatively coupled with the trim control system and includes an input device and a controller. The input device is configured to receive a re-trim input from a user. The controller is communicatively coupled with the input device and is configured to control the trim control system, to obtain the re-trim input from the user, and to set a pitch trim of the aircraft based on a stable flight condition at a present airspeed of the aircraft in response to the re-trim input from the input device.

20 Claims, 2 Drawing Sheets

(56) References Cited

U.S. PATENT DOCUMENTS

| | | |
|---|---|---|
| 8,606,437 B2 | 12/2013 | Caldeira et al. |
| 9,058,040 B2 | 6/2015 | Blechen et al. |
| 2003/0127569 A1 | 7/2003 | Bacon et al. |
| 2004/0093130 A1 | 5/2004 | Osder et al. |
| 2004/0093310 A1 | 5/2004 | Thomborson |
| 2005/0173595 A1 | 8/2005 | Hoh |
| 2006/0253230 A1 | 11/2006 | Fanciullo et al. |
| 2009/0186320 A1 | 7/2009 | Rucci et al. |
| 2009/0187292 A1 | 7/2009 | Hreha et al. |
| 2010/0145555 A1 | 6/2010 | Hagerott et al. |
| 2011/0137496 A1 | 6/2011 | Everett et al. |
| 2011/0168851 A1 | 7/2011 | Cherepinsky |
| 2011/0251739 A1 | 10/2011 | Tomas et al. |
| 2012/0072056 A1 | 3/2012 | Hasan et al. |
| 2012/0253561 A1 | 10/2012 | Ellis et al. |
| 2012/0290153 A1 | 11/2012 | Olsoe et al. |
| 2013/0138274 A1 | 5/2013 | Caldeira et al. |
| 2014/0021303 A1 | 1/2014 | Salamat et al. |
| 2014/0288731 A1 | 9/2014 | Hagerott et al. |
| 2015/0081140 A1 | 3/2015 | Moune et al. |
| 2015/0329199 A1 | 11/2015 | Golborne et al. |
| 2016/0185448 A1 | 6/2016 | Scacchi et al. |

AIRCRAFT, SYSTEMS, AND METHODS FOR TRIM CONTROL IN FLY-BY-WIRE AIRCRAFT SYSTEMS

CROSS-REFERENCE TO RELATED APPLICATION

This application is a continuation of U.S. patent application Ser. No. 14/513,125, filed Oct. 13, 2014, which is incorporated herein by reference in its entirety.

TECHNICAL FIELD

The technical field relates generally to trim control in fly-by-wire aircraft systems, and more particularly relates to an input device for a fly-by-wire system that includes autopilot disconnect and pitch re-trim capabilities.

BACKGROUND

A conventional aircraft typically includes flight control surfaces that are mechanically coupled with a flight control input device. The flight control surfaces alter the aerodynamic forces on the aircraft to adjust the pitch, roll, or yaw angles of the aircraft. Feedback forces from the aerodynamic effect on the flight control surfaces are transferred through the mechanical connection to the flight control input device, which is also known as an inceptor. These feedback forces indicate various flight conditions to the pilot of the aircraft.

With the advent of fly-by-wire technology over the past half century, the definition of a conventional aircraft is changing. Fly-by-wire technology mechanically decouples the inceptor from the flight control surfaces. Instead, the flight control surfaces are adjusted by actuators that are electronically coupled with the inceptor. Trim control in such fly-by-wire aircraft is typically accomplished with a manual trim switch located on the flight control input device.

While such systems are suitable for their intended purpose, the need for improved fly-by-wire systems is essentially constant. As such, it is desirable to provide a fly-by-wire system with improved trim control. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of aircraft, fly-by-wire systems, and controllers are disclosed herein.

In a first non-limiting embodiment, an aircraft includes, but is not limited to, a trim control system and a fly-by-wire system. The trim control system is configured for controlling surfaces of the aircraft. The fly-by-wire system is communicatively coupled with the trim control system and includes an input device and a controller. The input device is configured to receive a re-trim input from a user. The controller is communicatively coupled with the input device and is configured to control the trim control system, to obtain the re-trim input from the user, and to set a pitch trim of the aircraft based on a stable flight condition at a present airspeed of the aircraft in response to the re-trim input from the input device.

In a second non-limiting embodiment, a fly-by-wire system for an aircraft includes, but is not limited to, an autopilot disconnect input device and a controller. The autopilot disconnect input device is configured to receive a re-trim input from a user. The controller is communicatively coupled with the autopilot disconnect input device and is configured to control a trim control system that is configured for controlling surfaces of the aircraft, obtain the re-trim input, set a pitch trim of the aircraft based on a stable flight condition at a current airspeed of the aircraft in response to obtaining the re-trim input from the autopilot disconnect input device when an autopilot is disengaged, and disengage the autopilot in response to an autopilot disconnect input from the autopilot disconnect input device when the autopilot is engaged.

In a third non-limiting embodiment, a controller for use with a fly-by-wire system includes, but is not limited to, a processor and a memory unit. The memory unit is coupled with the processor and stores instructions for the processor. The instructions are configured to cooperate with the processor to control a trim control system that is configured to control surfaces of the aircraft, obtain a re-trim input from a user of an input device, set a pitch trim of the aircraft based on a stable flight condition at a current airspeed of the aircraft in response to the re-trim input when an autopilot is disengaged, and disengage the autopilot in response to an autopilot disconnect input from the autopilot disconnect input device when the autopilot is engaged.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of aircraft, fly-by-wire systems, and controllers for fly-by-wire systems are disclosed herein. The embodiments include various configurations of flight control systems that retain positive static non-maneuvering "speed" stability consistent with conventional aircraft as well as conventional fly-by-wire flight control systems. In one embodiment, an autopilot (AP) disconnect button input device on a side stick inceptor provides the capability to allow the pilot to "re-trim" the longitudinal (pitch) trim to a stabilized 1 g flight condition consistent with the airspeed at the time of selection. The pushbutton input device includes the primary functionality to both (1) provide pilot quick disconnect of the autopilot (if engaged) and (2) interrupt/disable manual pitch trim if such manual pitch trim is currently being commanded. Further use of the pushbutton input device will "re-trim" the aircraft to the present airspeed, as will be described below.

Figure 1:
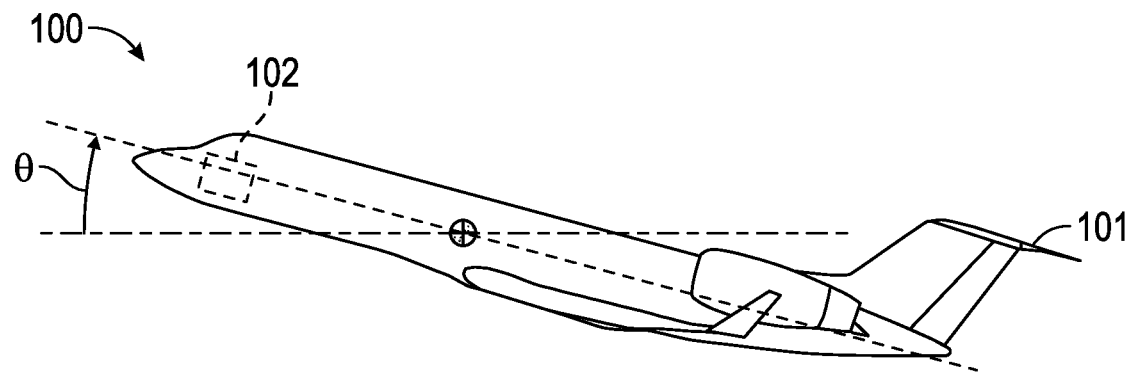
FIG. 1 is a simplified block diagram illustrating a non-limiting embodiment of an airplane in accordance with teachings of the present disclosure.

Referring now to FIG. 1, an example of an airplane 100 with a fly-by-wire system 102 is illustrated in accordance with some embodiments. Although airplane 100 is described in this description, it should be appreciated that fly-by-wire system 102 may be any control-by-wire system utilized in other aircraft, land vehicles, water vehicles, space vehicles, or other machinery without departing from the scope of the present disclosure. For example, fly-by-wire system 102 may be utilized in submarines, helicopters, airships, spacecraft, automobiles, or machinery. Airplane 100 is illustrated in flight with a pitch angle θ relative to a horizontal plane, as will be appreciated by those of ordinary skill in the art.

Figure 2:
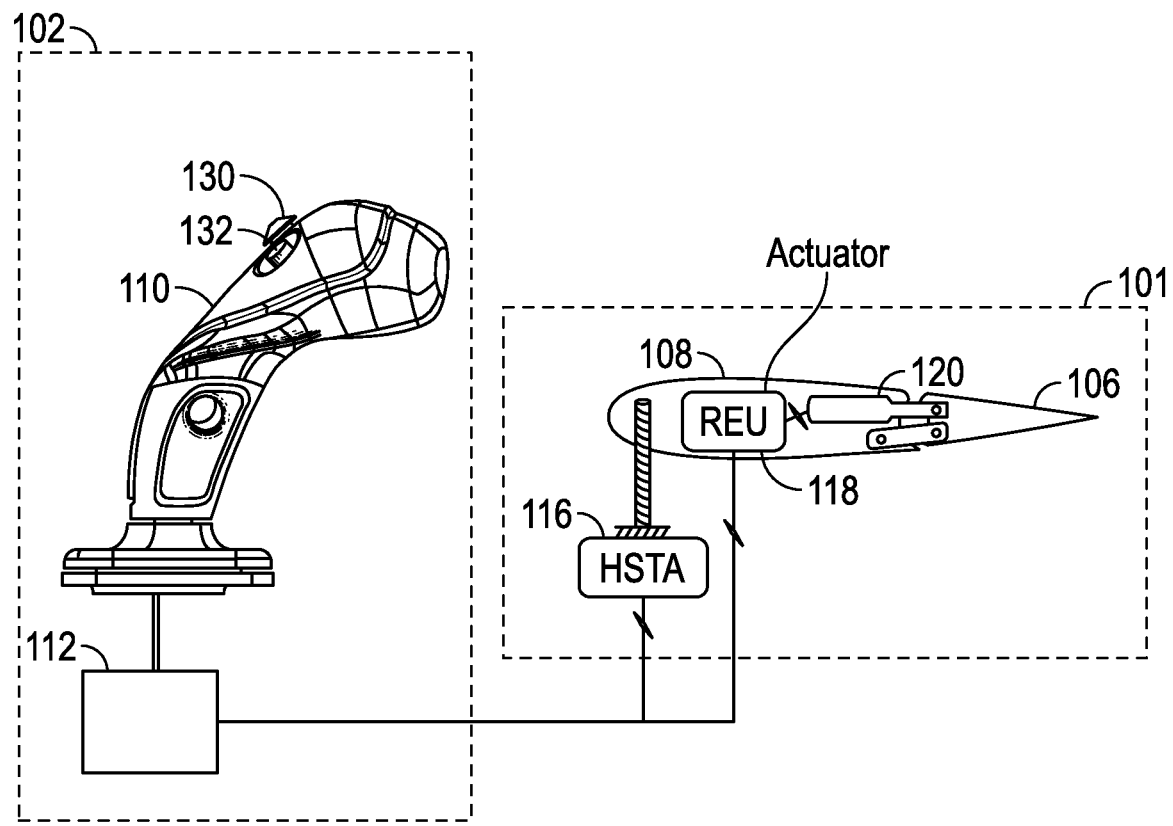
FIG. 2 is a simplified block diagram illustrating a non-limiting embodiment of a trim control system and a non-limiting embodiment of a fly-by-wire system of the aircraft illustrated in FIG. 1, in accordance with teachings of the present disclosure.

Referring now to FIG. 2, examples of trim control system 101 and fly-by-wire system 102 are illustrated in accordance with some embodiments. Trim control system 101 is configured to control flight control surfaces of airplane 100, such as an elevator 106 and a horizontal stabilizer 108. Elevator 106 adjusts pitch angle θ of airplane 100. Horizontal stabilizer 108 is a trim device that relieves some of the force required to maintain elevator 106 at the present position, as will be appreciated by those with ordinary skill in the art. It should be appreciated that trim control system 101 may utilize alternative elevator and trim configurations without departing from the scope of the present disclosure. In the example provided, trim control system 101 includes a horizontal stabilizer trim actuator (HSTA) 116, a remote electronic unit (REU) 118, and a hydraulic actuator 120.

Fly-by-wire system 102 includes an inceptor 110 and a controller 112. As used herein, the term "fly-by-wire" encompasses all systems in which an input device is mechanically operationally disconnected from a machine or portions of a machine that are controlled by the input device. For example, fly-by-wire as used herein encompasses terms used for the specific technology used to communicate commands between the input device and an electronic controller, such as fly-by-light or fly-by wireless.

Inceptor 110 is a pilot input device that is in electronic communication with controller 112 to manipulate control surfaces of airplane 100. In the example provided, inceptor 110 is a primary control input device that cooperates with controller 112 for pilot manipulation of elevator 106 to adjust the pitch axis of airplane 100. Inceptor 110 may be a control column, a side stick, or other suitable device disposed for use by a pilot of airplane 100. It should be appreciated that multiple inceptors 110 may be utilized to permit two pilots or operators to control the vehicle, either individually or in concert. In some embodiments, inceptor 110 is located remotely from airplane 100, such as for an unmanned aerial vehicle.

Inceptor 110 includes a manual trim control 130 and an input device 132. Manual trim control 130 is a secondary control input device configured to adjust a trim condition of airplane 100 by manually adjusting a trim airspeed. For example, trim control 130 may manipulate horizontal stabilizer 108, as will be appreciated by those of ordinary skill in the art. Manual trim control 130 may take the form of a switch, knob, or other suitable control device.

Input device 132 cooperates with controller 112 to operate as an autopilot (AP) disconnect as well as a trim speed reset input device to control trim control system 101, as will be described below with reference to FIG. 3. In the example provided, input device 132 is an autopilot disconnect input device disposed on inceptor 110 in a location suitable for a conventional AP disconnect button. For example, input device 132 may be disposed within the reach of a thumb of the pilot for simple operation during flight.

Controller 112 may include any combination of software and hardware. For example, controller 112 may include an application specific integrated circuit (ASIC), an electronic circuit, a processor (shared, dedicated, or group) and memory that execute one or more software or firmware programs, a combinational logic circuit, and/or other suitable components that provide the described functionality. In some embodiments, various operations performed by controller 112 may be stored as instructions on a non-transitory computer readable medium. The instructions may be executed to cause one or more processors to perform the operations described below. In some embodiments, controller 112 includes multiple separate control modules operating together to perform the operations described below. In the illustrated embodiment, controller 112 is configured to perform the method described in FIG. 3.

In some embodiments, controller 112 is a flight control computer of airplane 100. In the example provided, controller 112 is configured to control airplane 100 with a G-command system exhibiting speed stability. Speed stability describes a tendency of an aircraft to return to a trimmed speed without intervention from the pilot after a disturbance of the aircraft from the trimmed speed. For example, the displacement of inceptor 110 may command a normal acceleration response, and the deviation from the trim condition (airspeed in this example) creates an additional G-command that augments the pilot's input. It should be appreciated that some embodiments use different parameters for control and trim, such as flight path angle, angle of attack, or pitch rate.

In the example provided, controller 112 further controls airplane 100 with alpha limiting and speed protection features. Alpha limiting is a subset of the normal control law that restricts pilot commands if such commands would result in a stall of airplane 100 at the desired angle of attack and airspeed. Speed protection restricts pilot commands that would result in airplane 100 exceeding an upper threshold airspeed. These features may be similar to conventional alpha limiting and speed protection, as will be appreciated by those with ordinary skill in the art.

Figure 3:
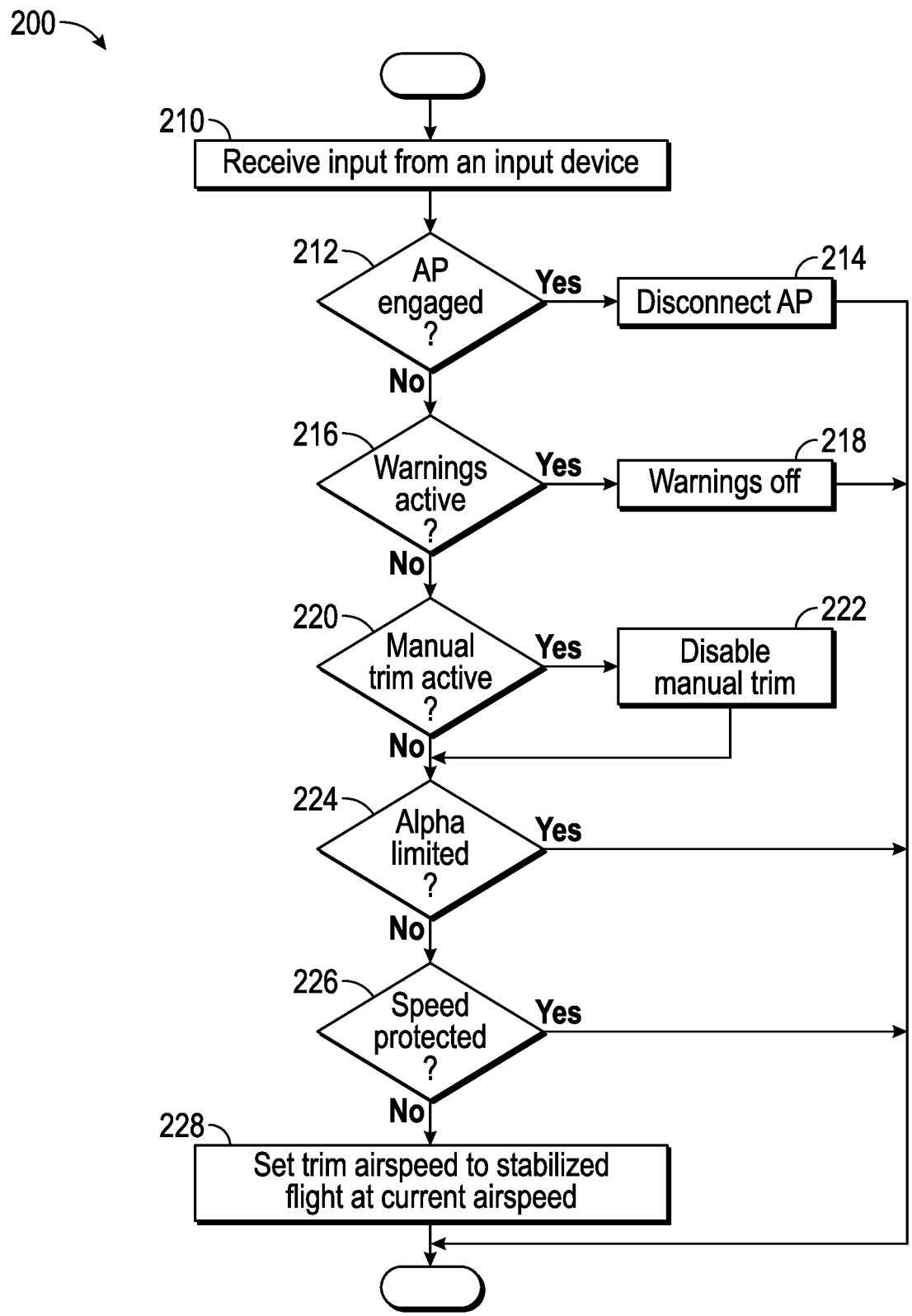
FIG. 3 is a flow diagram illustrating a method of controlling a fly-by-wire system of an aircraft in accordance with some embodiments.

Referring now to FIG. 3, a method 200 is illustrated in accordance with some embodiments. In the embodiment provided, method 200 is performed by controller 112. Operation 210 received input from an input device. For example, controller 112 may receive input from input device 132 in operation 210.

Operation 212 determines whether an autopilot (AP) is engaged. When the autopilot is engaged, the received input is an autopilot disconnect input and operation 214 disconnects the autopilot in response to receiving the autopilot disconnect input. For example, controller 112 may determine whether the autopilot of airplane 100 is engaged, and may disconnect the autopilot to enable manual flight of airplane 100 in response to receiving the autopilot disconnect input from input device 132. In the example provided, controller 112 takes no further action in response to receiving the autopilot disconnect input.

Operation 216 determines whether aural or visual warnings for a disengaged autopilot are active. Operation 218 turns off or deactivates the warnings when the warnings are active. Accordingly, a first depression the input device when the autopilot is active will automatically disengage the autopilot. A second depression disables any active autopilot disengage cues.

When the autopilot is disengaged, the input from the input device is a re-trim input and operation 220 determines whether a manual trim is active. The manual trim is active when an input from a manual trim control is currently being received when the re-trim input is received, such as during failure of the manual trim control or when simultaneously pressing the manual trim control and the input device. When the manual trim is active when the re-trim input is received, operation 222 disables the manual trim. In the example provided, manual trim control remains disabled until controller 112 is reset. For example, when a manual trim input from trim control 130 is active while re-trim input from input device 132 is received, controller 112 will disable manual trim control 130. When controller 112 does not disable manual trim control 130, fly-by-wire system 102 is configured to set the pitch trim of the airplane 100 based on a manual trim input from trim control 130 when the autopilot is disengaged.

Operations 224 and 226 determine whether alpha limiting and/or speed protection are active. In the example provided, when alpha limiting and/or speed protection are actively limiting maneuvers of the aircraft, the re-trim input will be disregarded and the trim airspeed will not be reset. For example, controller 112 may disregard the re-trim input when fly-by-wire system 102 is currently limiting maneuvers of the airplane 100 based on alpha limiting, speed protecting, or both alpha limiting and speed protecting.

When alpha limiting and/or speed protection are not active, operation 228 sets a trim airspeed to a stabilized flight condition at the current airspeed. For example, controller 112 may set the pitch trim airspeed of airplane 100 based on a stabilized 1 G flight condition as the stable flight condition at the present airspeed in response to receiving the re-trim input while alpha limiting and/or speed protection are disabled.

As used herein, the term "present airspeed" refers to the airspeed of airplane 100 at a time at or near the time of the re-trim input. For example, the present airspeed may be an instantaneous value from an airspeed sensor or may be an average value over a specified period of time around the time of the re-trim input (e.g., average airspeed over 1 second).

In the example provided, the re-trim functionality will be set to a pre-determined trim rate selected to reduce any undesirable pitch transients. For example, the pre-determined trim rate may be selected to be 0.10 g/sec.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. An aircraft comprising:
    a trim control system for controlling surfaces of the aircraft; and
    a fly-by-wire system communicatively coupled with the trim control system, the fly-by-wire system comprising:
        an inceptor with an input device configured to receive inputs from a user; and
        a controller communicatively coupled with the input device, the controller configured to:
            actively control the trim control system to provide positive speed stability about a selected trim airspeed while permitting continuous manual flight;
            responsive to receiving an input from the user at the input device when an autopilot is engaged, disengage the autopilot; and
            responsive to receiving the input from the user at the input device when the autopilot is disengaged, reset the selected trim airspeed based on a stable flight condition at a present airspeed of the aircraft.

2. The aircraft of claim 1, wherein the controller is configured to reset the selected trim airspeed based on the stable flight condition at the present airspeed of the aircraft based on a stabilized 1G flight condition as the stable flight condition.

3. The aircraft of claim 1, wherein the controller is further configured to not reset the selected trim airspeed when the fly-by-wire system is currently limiting maneuvers of the aircraft based on alpha limiting, speed protecting, or both alpha limiting and speed protecting.

4. The aircraft of claim 1, wherein the fly-by-wire system further includes a manual trim control, and wherein the controller is further configured to set a pitch trim of the aircraft based on a manual trim input from the manual trim control when the autopilot is disengaged.

5. The aircraft of claim 4, wherein the controller is further configured to disable the manual trim control in response to receiving the input from the input device while receiving the manual trim input from the manual trim control.

6. The aircraft of claim 1, wherein the input device is a pushbutton input device configured to receive the inputs from the user as discrete depressions of the pushbutton input device.

7. The aircraft of claim 1, wherein the fly-by-wire system further includes a manual trim control, and wherein the controller is further configured to:
    set a pitch trim of the aircraft based on a manual trim input from the manual trim control when the autopilot is disengaged;
    disable the manual trim control in response to receiving the input from the input device while receiving the manual trim input from the manual trim control;
    reset the selected trim airspeed based on the stable flight condition at the present airspeed of the aircraft based on a stabilized 1G flight condition as the stable flight condition; and
    not reset the selected trim airspeed when the fly-by-wire system is currently limiting maneuvers of the aircraft based on alpha limiting, speed protecting, or both alpha limiting and speed protecting.

8. The aircraft of claim 1, wherein the fly-by-wire system further includes a manual trim control input device configured to manually adjust trim airspeed.

9. A controller for use with a fly-by-wire system of an aircraft that includes an input device configured to receive inputs from a user, the controller comprising:
    at least one processor; and
    at least one memory unit coupled with the at least one processor, the at least one memory unit storing instructions for the at least one processor, wherein the instructions are configured to cooperate with the at least one processor to:
        actively control a trim control system to provide positive speed stability about a selected trim airspeed while permitting continuous manual flight;

responsive to receiving an input from the user at the input device when an autopilot is engaged, disengage the autopilot; and responsive to receiving the input from the user at the input device when the autopilot is disengaged, reset the selected trim airspeed based on a stable flight condition at a present airspeed of the aircraft.

10. The controller of claim 9, wherein the controller is configured to reset the selected trim airspeed based on the stable flight condition at the present airspeed of the aircraft based on a stabilized 1G flight condition as the stable flight condition.

11. The controller of claim 9, wherein the controller is further configured to not reset the selected trim airspeed when the fly-by-wire system is currently limiting maneuvers of the aircraft based on alpha limiting, speed protecting, or both alpha limiting and speed protecting.

12. The controller of claim 9, wherein the fly-by-wire system further includes a manual trim control, and wherein the controller is further configured to set a pitch trim of the aircraft based on a manual trim input from the manual trim control when the autopilot is disengaged.

13. The controller of claim 12, wherein the controller is further configured to disable the manual trim control in response to receiving the input from the input device while receiving the manual trim input from the manual trim control.

14. The controller of claim 9, wherein the input device is a pushbutton input device on an inceptor in the aircraft, where the pushbutton input device is configured to receive the inputs from the user as discrete depressions of the pushbutton input device.

15. The controller of claim 9, wherein the fly-by-wire system further includes a manual trim control, and wherein the controller is further configured to:

set a pitch trim of the aircraft based on a manual trim input from the manual trim control when the autopilot is disengaged;

disable the manual trim control in response to receiving the input from the input device while receiving the manual trim input from the manual trim control;

reset the selected trim airspeed based on the stable flight condition at the present airspeed of the aircraft based on a stabilized 1G flight condition as the stable flight condition; and not reset the selected trim airspeed when the fly-by-wire system is currently limiting maneuvers of the aircraft based on alpha limiting, speed protecting, or both alpha limiting and speed protecting.

16. An aircraft comprising:

a trim control system for controlling surfaces of the aircraft; and a fly-by-wire system communicatively coupled with the trim control system, the fly-by-wire system comprising:

an inceptor with an input device configured to receive inputs from a user; and a controller communicatively coupled with the input device, the controller configured to:

actively control the trim control system to provide positive speed stability about a selected trim airspeed while permitting continuous manual flight, wherein the positive speed stability is a tendency of the aircraft to return to the selected trim airspeed after a disturbance of the aircraft from the selected trim airspeed;

responsive to receiving an input from the user at the input device when an autopilot is engaged disengage the autopilot;

responsive to receiving the input from the user at the input device when the autopilot is disengaged disengage manual trim control when the manual trim control is engaged;

responsive to receiving the input from the user at the input device when the autopilot is disengaged, and the fly-by-wire system is not currently limiting maneuvers of the aircraft based on alpha limiting or speed protecting reset the selected trim airspeed based on a stable flight condition at a present airspeed of the aircraft.

17. The aircraft of claim 16, wherein the controller is configured to reset the selected trim airspeed based on the stable flight condition at the present airspeed of the aircraft based on a stabilized 1G flight condition as the stable flight condition.

18. The aircraft of claim 17, wherein the aircraft is a fixed-wing aircraft.

19. The aircraft of claim 16, wherein the fly-by-wire system further includes a manual trim control input device configured to manually adjust trim airspeed.

20. The aircraft of claim 16, wherein the input device is a pushbutton input device configured to receive the inputs from the user as discrete depressions of the pushbutton input device.

* * * * *